(12) United States Patent
Bronstering

(10) Patent No.: US 8,936,019 B2
(45) Date of Patent: Jan. 20, 2015

(54) DEVICE FOR CONNECTING THE GLASS PANES OF A DOOR OF A DOMESTIC APPLIANCE

(75) Inventor: Hermann Bronstering, Wadersloh (DE)

(73) Assignee: Miele & Cie. KG, Guetersloh (DE)

( * ) Notice: Subject to any disclaimer, the term of this patent is extended or adjusted under 35 U.S.C. 154(b) by 1096 days.

(21) Appl. No.: 12/674,730

(22) PCT Filed: Aug. 7, 2008

(86) PCT No.: PCT/EP2008/006479
§ 371 (c)(1),
(2), (4) Date: Feb. 23, 2010

(87) PCT Pub. No.: WO2009/027011
PCT Pub. Date: Mar. 5, 2009

(65) Prior Publication Data
US 2011/0044754 A1 Feb. 24, 2011

(30) Foreign Application Priority Data
Aug. 27, 2007 (DE) .......................... 10 2007 040 670

(51) Int. Cl.
*F23M 7/00* (2006.01)
*F24C 15/04* (2006.01)

(52) U.S. Cl.
CPC .................................. *F24C 15/045* (2013.01)
USPC ........................ 126/194; 403/322.4; 52/656.9

(58) Field of Classification Search
CPC ............................... F24C 15/023; F25D 23/02
USPC .............. 403/167, 168, 205, 315–319, 322.4; 52/656.9, 786.13; 49/501; 126/190, 126/194, 197, 198, 100
See application file for complete search history.

(56) References Cited

U.S. PATENT DOCUMENTS 34,304 A * 2/1862 Krebs .............................. 292/37
3,296,763 A * 1/1967 Curl ........................... 52/204.64
(Continued)

FOREIGN PATENT DOCUMENTS

DE 10219349 A1 11/2003
DE 10336138 B3 10/2004
(Continued)

OTHER PUBLICATIONS

An International Search Report mailed Dec. 18, 2009, which issued during the prosecution of International Patent Application No. PCT/EP2008/00649; 4 pages.

*Primary Examiner* — Michael P Ferguson
*Assistant Examiner* — Nahid Amiri
(74) *Attorney, Agent, or Firm* — Leydig, Voit & Mayer, Ltd.

(57) ABSTRACT

A connecting device for connecting glass panes of a door of a household appliance includes a first retainer configured to connect to an outer glass pane. The first retainer includes a first insertion structure configured to receive an inner glass pane. A second retainer is fixed to the first retainer and configured to pivot from a first position to a second position and from the second position to the first position. The second retainer includes a locking element configured to retain the inner glass pane in the first position of the second retainer. The second retainer further includes an actuating element including a handle. The handle is configured to pivot the second retainer from the first position to the second position and from the second position to the first position.

20 Claims, 11 Drawing Sheets

(56) References Cited

U.S. PATENT DOCUMENTS

| | | | |
|---|---|---|---|
| 4,041,930 A * | 8/1977 | Katona | 126/198 |
| 4,253,286 A * | 3/1981 | Katona | 52/171.1 |
| 5,802,799 A * | 9/1998 | Thuleskar et al. | 52/656.5 |
| 6,430,894 B1 * | 8/2002 | Chae et al. | 52/786.1 |
| 6,941,721 B2 * | 9/2005 | Lind | 52/786.13 |
| 2003/0138307 A1 * | 7/2003 | Lind | 411/34 |
| 2004/0232133 A1 * | 11/2004 | Roch et al. | 219/393 |
| 2005/0028805 A1 | 2/2005 | Bronstering et al. | |
| 2005/0132663 A1 * | 6/2005 | Guhl et al. | 52/204.62 |

FOREIGN PATENT DOCUMENTS

| | | | |
|---|---|---|---|
| EP | 1030116 A2 | 8/2000 | |
| WO | WO 2004011739 A1 * | 2/2004 | E04F 13/08 |

* cited by examiner

US 8,936,019 B2

DEVICE FOR CONNECTING THE GLASS PANES OF A DOOR OF A DOMESTIC APPLIANCE

CROSS-REFERENCE TO PRIOR APPLICATIONS

This application is a U.S. National Phase application under 35§371 of International Application No. PCT/EP2008/006479, filed on Aug. 7, 2008 and claims benefit to German Patent Application No. DE 10 2007 040 670.5, filed on Aug. 27, 2007. The International Application was published in German on Mar. 5, 2009 as WO 2009/027011 A2 under PCT Article 21(2).

FIELD

The present invention relates to a device for connecting glass panes of a door of a household appliance, said device including a first retaining means and a second retaining means, the first retaining means being suitably adapted for connection to an outer glass pane, and the second retaining means being fixed to the first retaining means so that it can pivot from a first position to a second position and vice versa, the second retaining means further having locking elements suitably adapted to retain an inner glass pane in the first position of the second retaining means.

BACKGROUND

A device for connecting glass panes is described in German Patent Publication No. DE 103 36 138 B3, FIGS. 8, 9. The first retaining means of that device is adhesively bonded to the outer glass pane. Moreover, the first retaining means is connected to a bar extending transversely across the outer glass pane. The inner glass pane is placed on this bar and is then clamped between the second retaining means and said bar by pivoting the second retaining means. When the second retaining means is in the first position, the outer glass pane and the inner glass pane are firmly connected together. When the inner glass pane is in the mounted position, the first retaining means is substantially freely accessible and projects beyond the hinge-side edge of the inner glass pane. Because of this, the connecting device is not very appealing to the eye and, in addition, gets dirty very easily because it is located in the hinge area of the oven door where it is particularly prone to dirt accumulation.

The second retaining means can be moved from the first position to the second position using a tool, such as a screwdriver. For this purpose, the second retaining means is provided with a suitable tool engagement surface, which also gets dirty easily.

German Patent Application DE 102 19 349 A1 describes a door for a household appliance, including an inner glass pane facing the interior of the appliance, an outer glass pane facing the ambient environment, and a further glass pane, which is located between said inner and outer glass panes and is supported on a holding device. The further glass pane can be locked in position by a locking device. The locking device includes a locking element which, in a first position, positively locks the further glass pane in place and, in a Second position, releases the further pane. The locking device is suitably adapted to lock the further glass pane in place. This design does not allow for mounting or locking in place of the inner glass pane.

SUMMARY

In an embodiment, the present invention provides a connecting device for connecting glass panes of a door of a household appliance includes a first retainer configured to connect to an outer glass pane. The first retainer includes a first insertion structure configured to receive an inner glass pane. A second retainer is fixed to the first retainer and configured to pivot from a first position to a second position and from the second position to the first position. The second retainer includes a locking element configured to retain the inner glass pane in the first position of the second retainer. The second retainer further includes an actuating element including a handle. The handle is configured to pivot the second retainer from the first position to the second position and from the second position to the first position. The inner glass pane covers a substantial portion of the actuating element when the inner glass pane is received by the first insertion structure and retained by the locking element.

BRIEF DESCRIPTION OF THE DRAWINGS

An exemplary embodiment of a connecting device according to the present invention and a door of a household appliance including a connecting device according to the present invention is described in more detail with reference to the drawing, in which.

DETAILED DESCRIPTION

Figure 1:
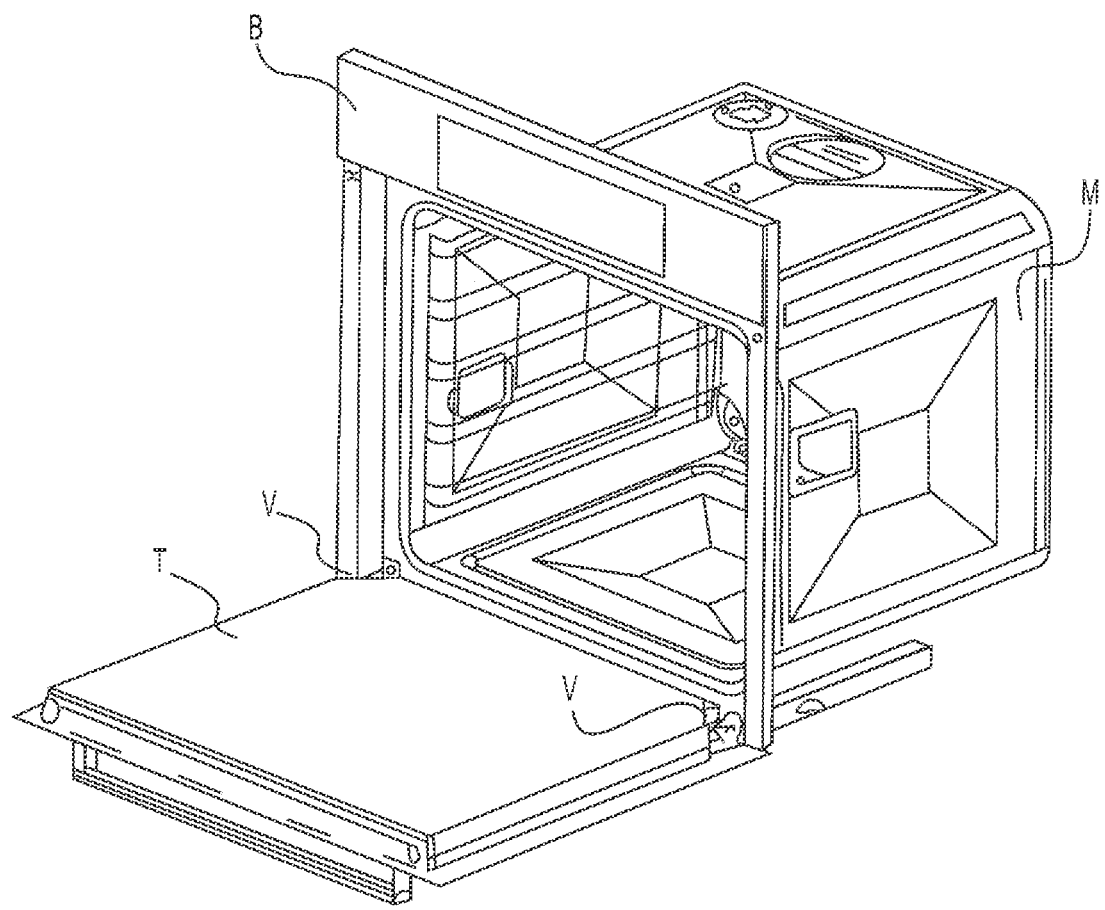
FIG. 1 is a perspective view of a portion of a household appliance in the form of a baking oven.
Figure 2:
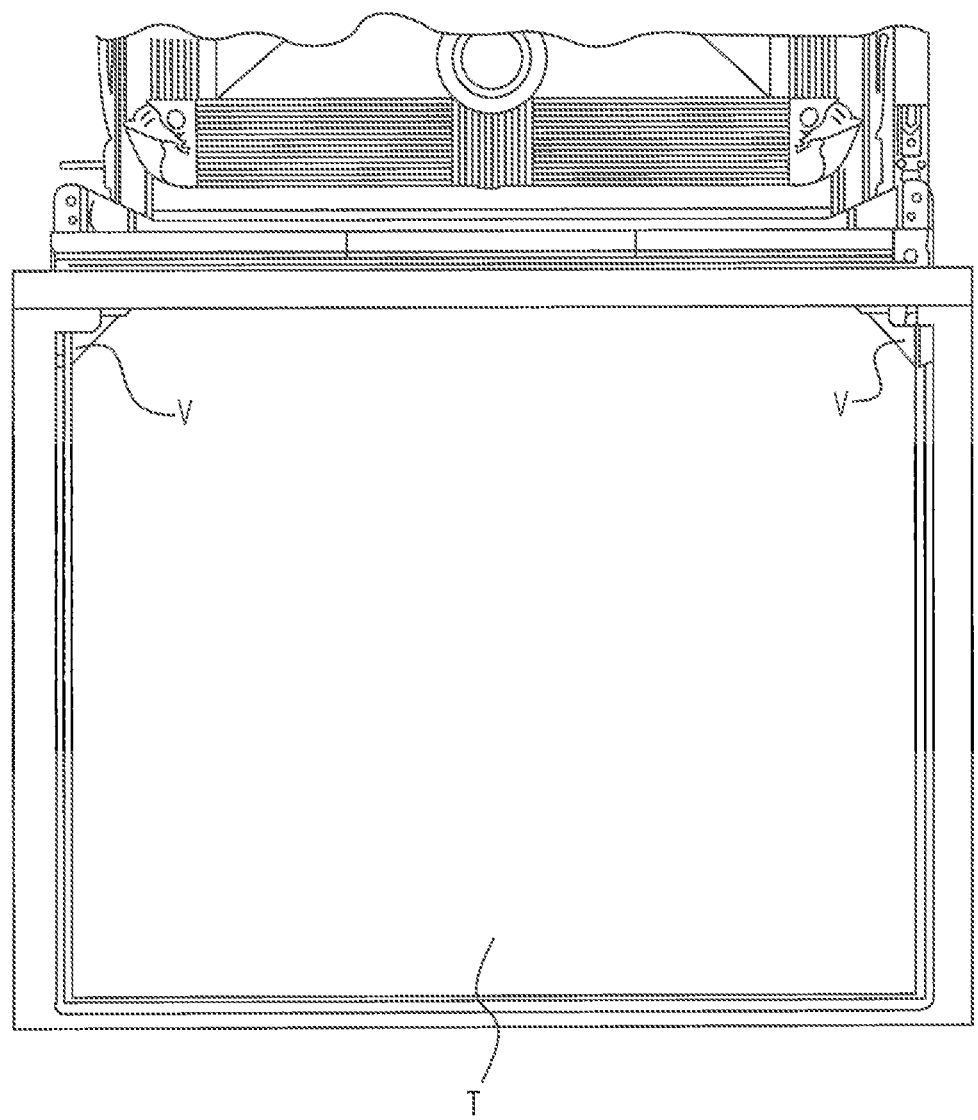
FIG. 2 is a top view showing the baking oven with its door open.
Figure 3:
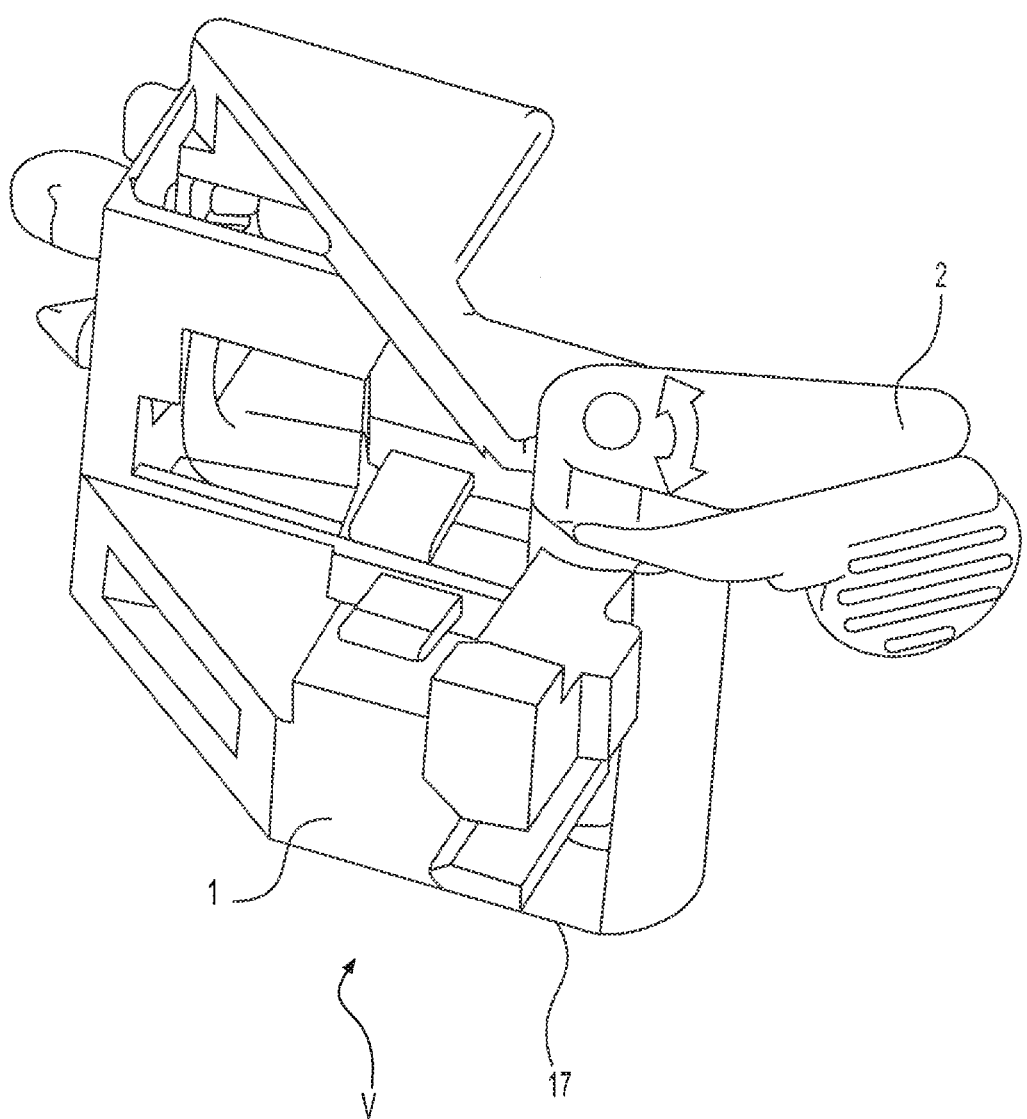
FIG. 3 is a perspective view of the connecting device according to the present invention.
Figure 4:
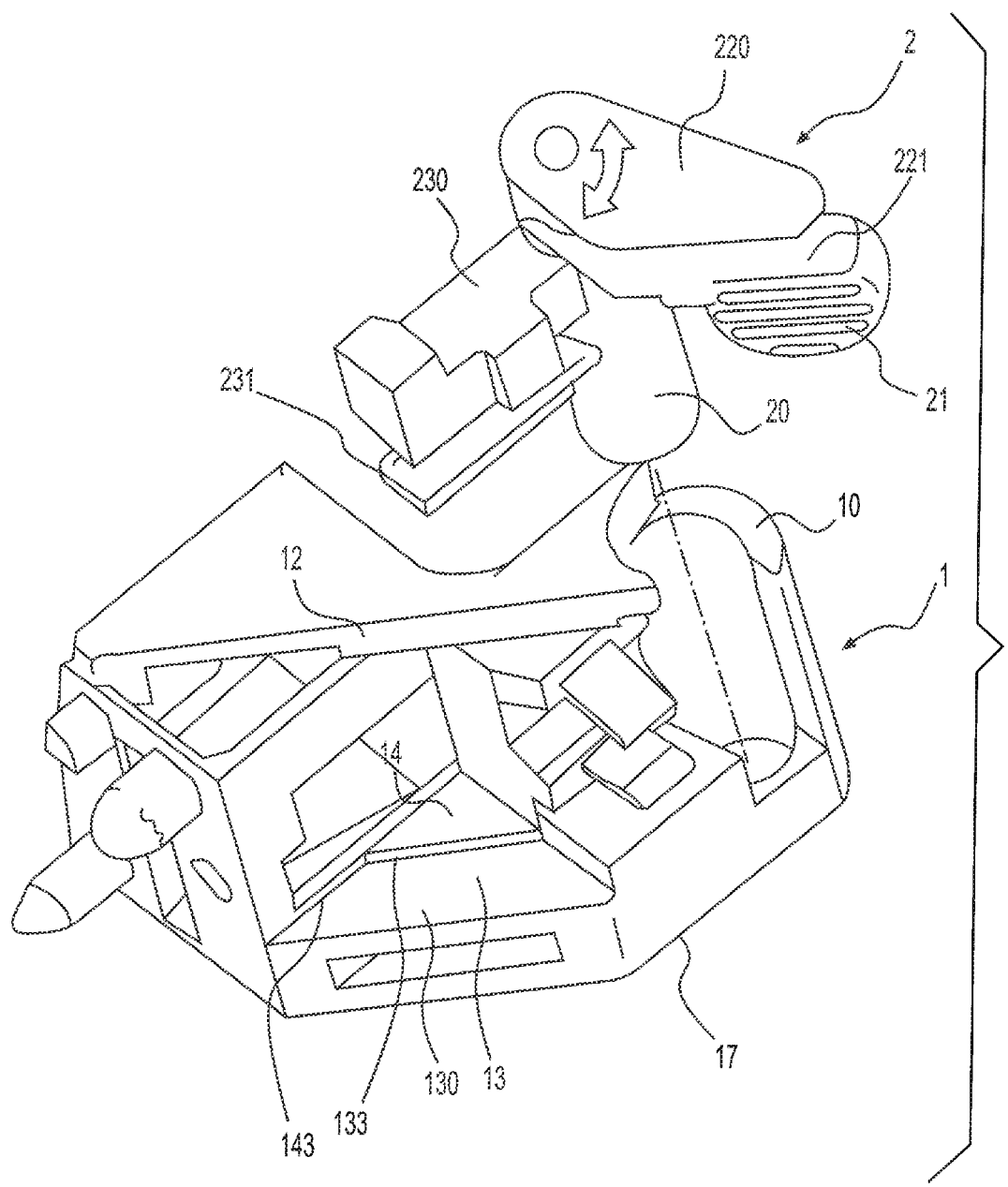
FIG. 4 is a first perspective exploded view of the connecting device.
Figure 5:
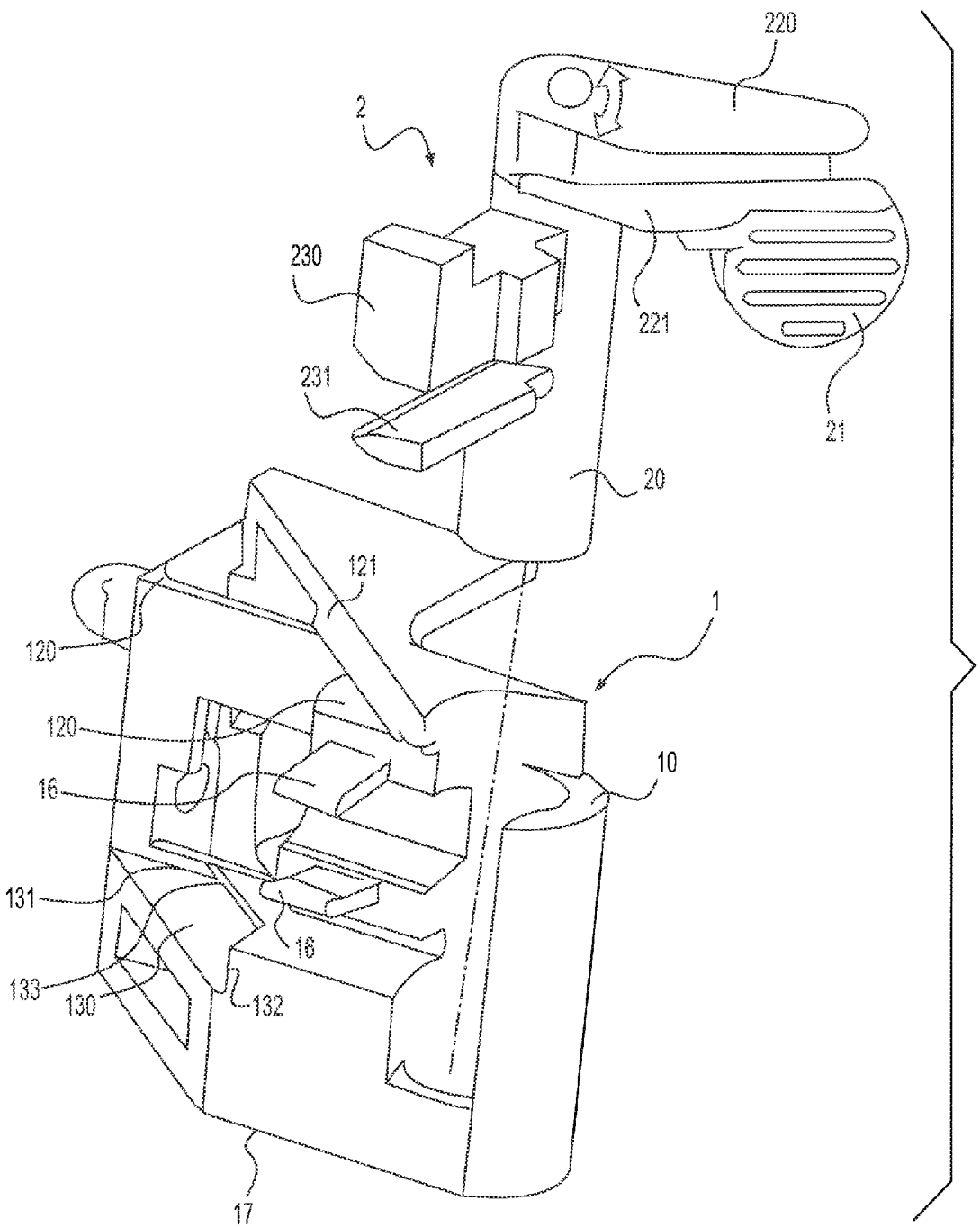
FIG. 5 is a second perspective exploded view of the connecting device.
Figure 6:
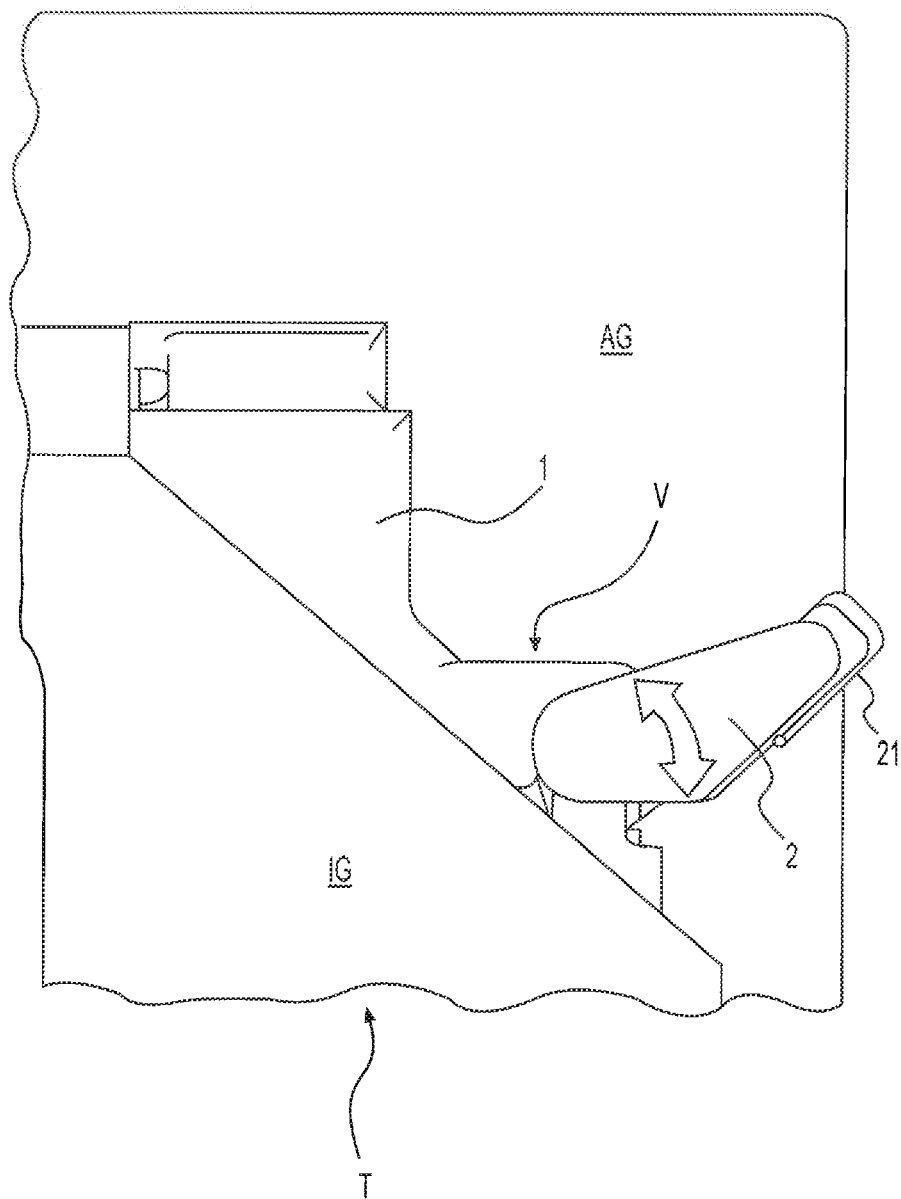
FIG. 6 is a view of a portion of an oven door, showing the connecting device of the present invention in a second position.
Figure 7:
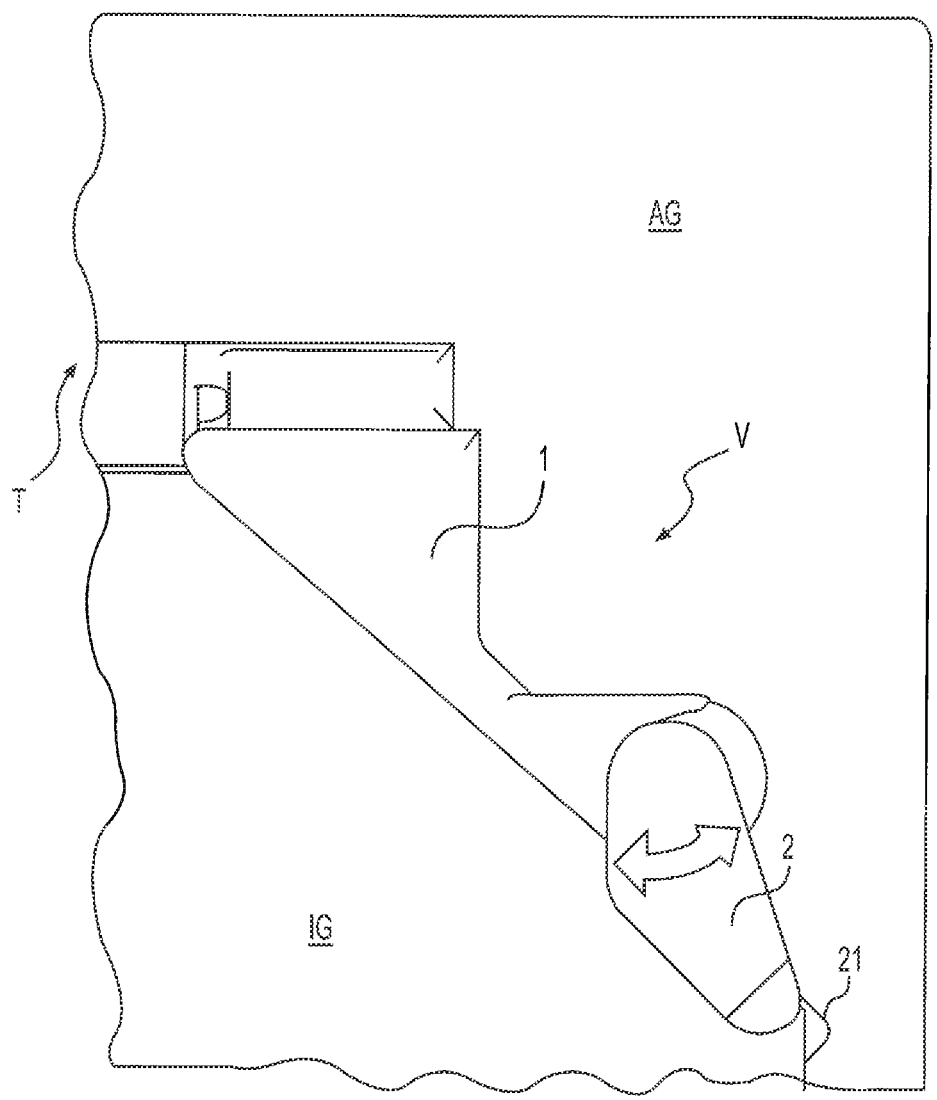
FIG. 7 is a view of the portion of the oven door of FIG. 6, showing the connecting device in a first position.

In an embodiment, the present invention provides a device for connecting glass panes of a door of a household appliance in such a way that, firstly, a pleasant appearance is obtained, and secondly, the connecting device is prevented from getting dirty.

In an embodiment, the first retaining means has a first insertion structure suitably adapted for insertion of an inner glass pane. Further, the second retaining means has an actuating element in the form of a handle and suitably adapted to pivot the second retaining means form the first position to the second position and vice versa. Finally, the connecting device is designed such that an inner glass pane inserted in the first insertion structure and retained by the locking elements covers the entire, or at least the major portion of, the actuating element. The handle allows the second retaining means to be moved from the first position to the second position and vice versa without using tools. Moreover, since the actuating element is covered, it is substantially protected from dirt accumulation.

The first insertion structure may be designed such that an inner glass pane inserted in the first insertion structure covers the entire, or at least the major portion of, the first retaining means.

In accordance with the present invention, the first insertion structure may be designed such that an inner glass pane inserted in the first insertion structure projects laterally beyond the first retaining means or is laterally flush with the first retaining means. Therefore, the first retaining means is substantially invisible to an observer.

The first retaining means of a connecting device according to the present invention may have a first surface suitably adapted to engage the outer glass pane in the assembled position.

The first retaining means of a connecting device according to the present invention may have one or more insertion structures, each suitably adapted to receive a further glass pane, respectively. These further insertion structures are preferably disposed between the first surface, which is provided for engagement of the first retaining means with the outer glass pane, and the first insertion structure for the inner glass pane.

The first insertion structure, respectively all insertion structures, are preferably suitably adapted to receive a corner of the glass pane or glass panes, respectively.

The first insertion structure for the inner glass pane, respectively the insertion structures for the further glass panes, may have contact surfaces with which the edges of the glass pane or glass panes may be in contact with. Preferably, the first insertion structure has only one contact surface. This single contact surface is at an angle of 45° to the long edges of the first glass pane to be inserted into the first insertion structure, the corner of said first glass pane being cut off at a 45° angle.

The further insertion structures have at least two contact surfaces, which are at right angles to each other and extend parallel to the long edges of the glass panes to be inserted. One or more of the further insertion structures may also have a third contact surface. Similarly to the contact surface of the first insertion structure, this third contact surface advantageously extends at an angle of approximately 45° to the other contact surfaces of the further insertion structures. With such a configuration of the insertion structures, it can be achieved that only one of the glass panes can be inserted into one of the insertion structures, respectively. This eliminates the chance of mixing up the order of the glass panes during assembly.

The first insertion structure, respectively the further insertion structures, may have at least one bearing surface on which rests a portion of the front or rear side of the glass pane. The bearing surfaces of the various insertion structures are arranged so that they do not coincide in a vertical projection. This eliminates the need to provide the first retaining means with undercuts into which the glass panes would have to be inserted. As can easily be understood, the bearing surfaces lie in different planes.

The first retaining means of a connecting device according to the present invention may have a pivot pin receptacle. The second retaining means preferably has a pivot pin by which it is advantageously inserted into the pivot pin receptacle of the first retaining means.

In accordance with the present invention, the second retaining means may have one or more first locking elements suitably adapted to lock a glass pane inserted in the first insertion structure in place when the second retaining means is in the first position. Moreover, the second retaining means may have further locking elements suitably adapted to lock a glass pane inserted in the further insertion structures in place when the second retaining means is in the first position. The locking elements are suitably adapted to engage over or under glass planes, which are inserted in the insertion structures, when the second retaining means is in the first position.

The further locking elements may be suitably adapted to press glass panes inserted in the insertion structures against the bearing surfaces when the second retaining means is in the first position. This allows the further glass panes to be mounted without play in the connection device.

The first locking elements and the further locking elements may be at an angle of 135° to each other. The first locking elements may be connected by a web, and the structure so formed may embrace the edge of the inner glass pane.

The first retaining means and the second retaining means may be provided with snap-fit structures to fix the second retaining means in the first position, so that the connection between the glass panes is prevented from being unintentionally or accidentally loosened during operation of the baking oven.

FIG. 1 shows a portion of a household appliance in the form of a baking oven, including an oven shell M, a covering frame B mounted to the front of oven shell M, and an oven door T attached to covering frame B and/or to components of the baking oven which are not shown. Oven door T is composed of a plurality of glass panes AG, 1G, 2G, IG, which are connected together, inter alia, by two connecting devices V. Connecting devices V are provided in the lower corners, i.e., in the hinge-side lower corners of oven door T.

Each of said connecting devices V is of two-part construction, including a first retaining means 1 and a second retaining means 2. First retaining means 1 has a first surface 17 by which it is adhesively bonded to the inner surface of outer glass pane AG. As an alternative to adhesive bonding, it is also possible to choose another suitable joining technique.

First retaining means 1 is provided with insertion structures 12, 13, 14. Further glass panes 1G, 2G, IG of oven door T can be inserted into these insertion structures 12, 13, 14. The aforesaid glass panes 1G, 2G, IG can be locked in place in insertion structures 12, 13, 14 by second retaining means 2. To this end, second retaining means 2 can be moved to a first position. When second retaining means 2 is in a second position, glass panes 1G, 2G, IG can be removed from insertion structures 12, 13, 14 and separated from outer glass pane AG.

First insertion structures 12 are provided for insertion of inner glass pane IG. The insertion structures include bearing surfaces 120, which lie parallel to first surface 17 and which, when inner glass pane IG is in the mounted position, lie parallel to outer glass pane AG when outer glass pane AG is in the mounted position. When inner glass pane IG is in the mounted position, its surface facing outer glass pane AG rests on bearing surfaces 120.

First insertion structure 12 further includes a first contact surface 121, which limits movement of inner glass pane IG in the plane of inner glass pane IG.

Similarly, insertion structure 13 for first further glass pane 1G includes a bearing surface 130. When first further glass pane 1G is in the mounted position, its surface facing outer glass pane AG rests on bearing surface 130, and thus on first retaining means 1. Two contact surfaces 131, 132 are provided perpendicular to bearing surface 130 to limit movement in the plane in which first further glass pane 1G is placed. Contact surfaces 131, 132 are connected via a contact surface 133 such that a trapezoidal insertion structure 13 is formed.

Figure 8:
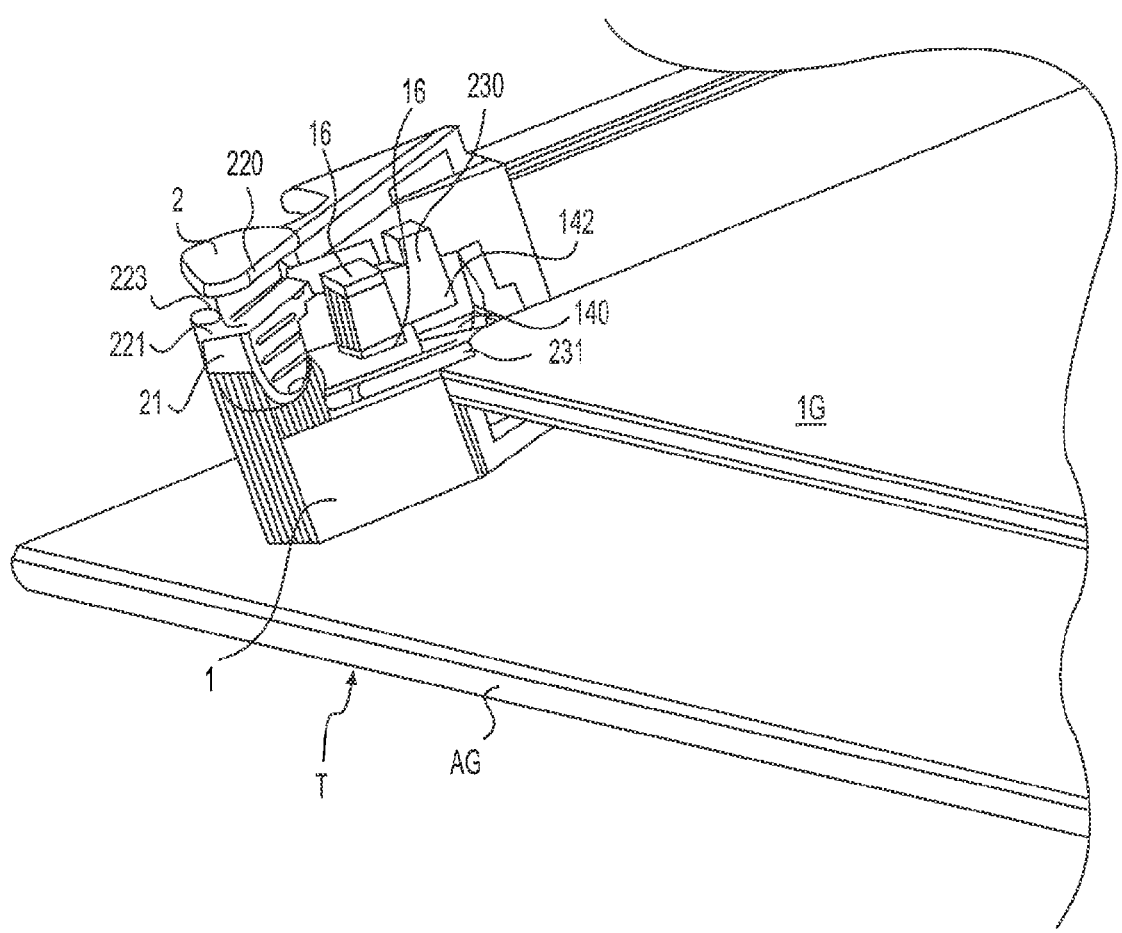
FIG. 8 is a perspective view of a portion of the oven door, showing the connecting device of the present invention, an outer glass pane, and a first further glass pane.

Similarly, an insertion structure 14 (FIG. 8) is provided for second further glass pane 2G. Insertion structure 14 for second further glass pane 2G similarly includes a bearing surface 140 on which second further glass pane 2G rests, and contact surfaces 142, 143 which limit movement in the plane in which second further glass pane 2G is placed.

Contact surfaces 131, 132 and 142, 143 together form an angle of 90°. Contact surfaces 131, 132, 142, 143 are disposed in two vertical projection planes which are at right angles to each other and which each form an angle of 45° with the projection plane of contact surfaces 121 and 133.

First retaining means 1 has a pivot pin receptacle 10 in which second retaining means 2 is supported by a pivot pin 20. Pivot pin 20 is provided with locking elements 220, 221, 230, 231 extending approximately perpendicular to the axis of rotation of pivot pin 20. First locking elements 220, 221 of locking elements 220, 221, 230, 231 are used to lock inner glass pane IG in place. In order to lock inner glass pane IG in the first position, first locking elements 220, 221 engage over and under the edge of said inner glass pane IG, thereby retaining it in first insertion structure 12. First locking elements 220, 221 are connected by a web 223.

Lower locking element 221; i.e., the one facing outer glass pane AG, is provided with a handle 21 for actuating second retaining means 2, said handle allowing second retaining means 2 to be moved from the first position to the second position and vice versa.

One of the further locking elements, namely locking element 231, is suitably adapted to lock first further glass pane 1G in place in the associated insertion structure 13. When second retaining means 2 is in the first position, the end of locking element 231 rests on the surface of first further glass pane 1G that faces away from outer glass pane AG. Thus, glass pane 1G is retained between locking element 231 and bearing surface 130 of associated insertion structure 13.

Figure 9:
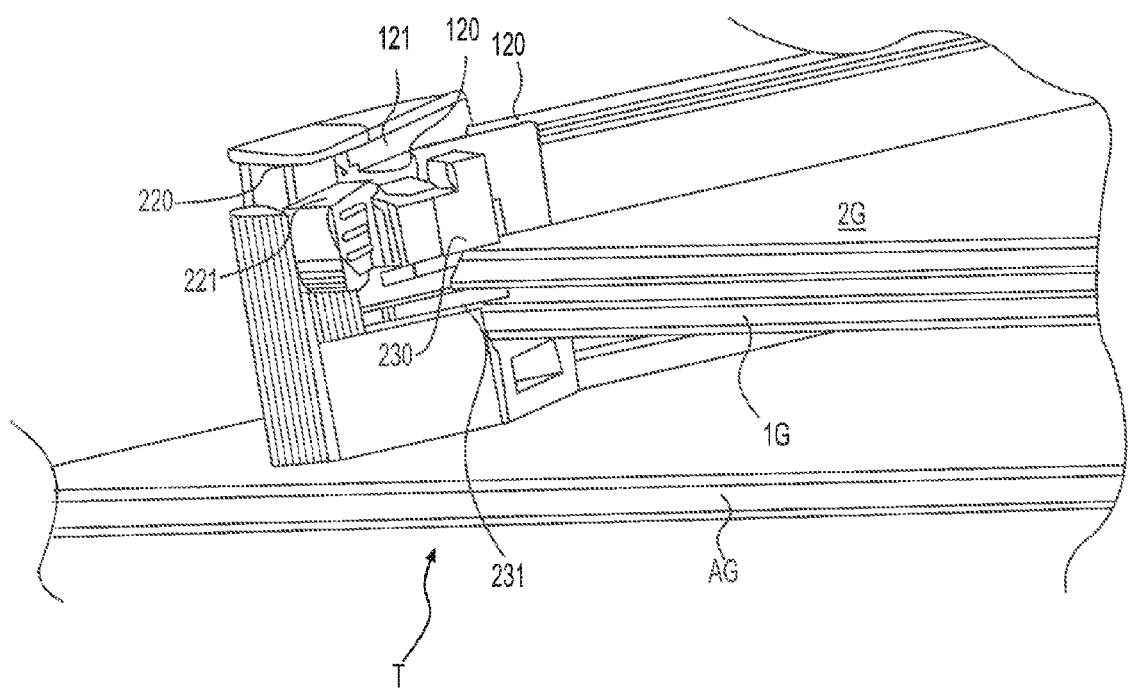
FIG. 9 is a view similar to FIG. 8, but showing an outer glass pane, a first further glass pane, and a second further glass pane.
Figure 10:
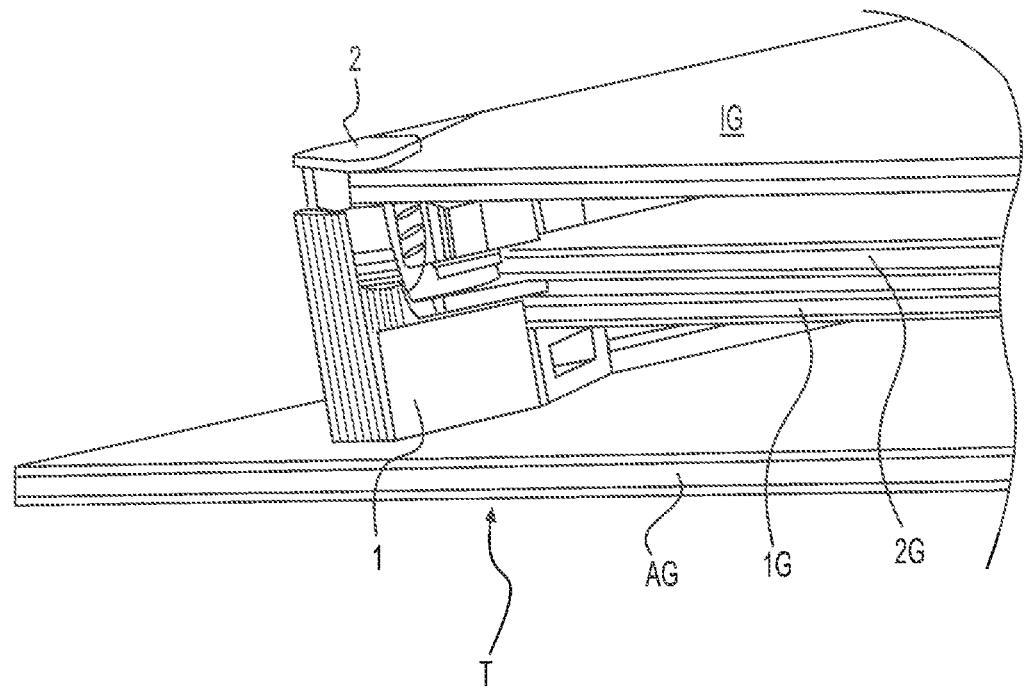
FIG. 10 is a view similar to FIGS. 8 and 9, showing a first and a second further glass pane, as well as an outer glass pane and an inner glass pane.
Figure 11:
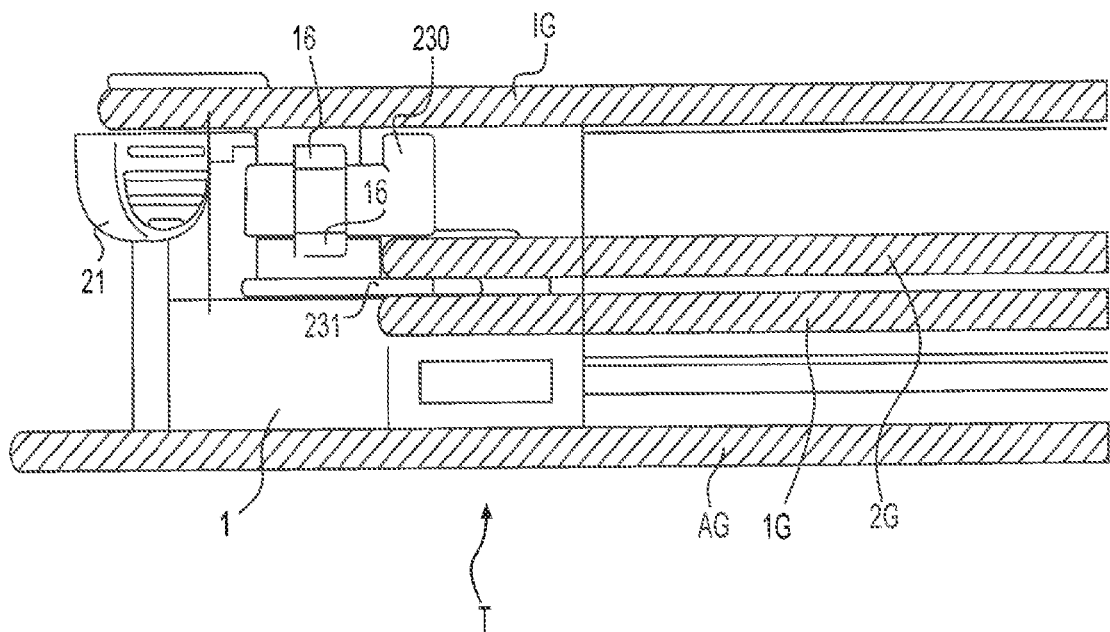
FIG. 11 is a partially cross-sectional view of the oven door, looking at the hinge-side edge.

Locking element 230 is provided to lock second further glass pane 2G in place, said locking element 230 engaging over second further glass pane 2G when second retaining means 2 is in the first position (FIG. 9).

First retaining means 1 is provided with two latching arms 16 which engage on the upper and lower surfaces, respectively, of locking element 230 when second retaining means 2 is in the first position, fixing second retaining means 2 in the first position by means of latching noses.

When second retaining means 2 is in the first position and glass panes AG, 1G, 2G, IG are in the mounted position, first retaining means 1 is substantially covered by inner glass pane 1G. Only the portion of first retaining means 1 that forms contact surface 121 of first retaining means 1 is not covered by inner glass pane IG. In any case, however, insertion structures 13, 14 for first further glass pane 1G and second further glass pane 2G are covered and not accessible to the user. This also reduces the chance of dirt accumulating in these areas. When second retaining means 2 is in the first position and glass panes AG, 1G, 2G, IG are in the mounted position, the only portion of second retaining means 2 that can be seen when looking perpendicularly at the inner surface of the oven door is the portion that forms locking element 220. Moreover, handle 21, by which second retaining means 2 can be moved from the first position to the second position, is nearly completely covered by inner glass pane IG.

When second retaining means 2 is in the second position, locking elements 220, 221, 230, 231 are pivoted so that they are no longer in contact or engagement with glass panes 1G, 2G, IG. Therefore, when second retaining means 2 is in the second position, these first glass panes 1G, 2G, IG can be removed from first retaining means 1 and, more specifically, from insertion structures 12, 13, 14 of first retaining means 1.

Overall, the present invention enables the connecting device V to be substantially covered by inner glass pane IG of oven door T. This is assisted, in particular, in that locking elements 230, 231, which retain further glass panes 1G, 2G in their insertion structures 13, 14, are provided on pivot pin 20 at an offset of approximately 135° from first locking elements 220, 221 for inner glass pane IG, and in that inner glass pane IG has, at its corners, a short edge which is slanted at 45° with respect to the long sides of inner glass pane IG.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

What is claimed is:

1. A connecting device for connecting glass panes of a door of a household appliance comprising:
    a first retainer connected to an outer glass pane, the first retainer including a first insertion structure, a pivot pin receptacle, and a latching arm, wherein the first insertion structure receives an inner glass pane; and
    a second retainer including a pivot pin pivotally connected to the first retainer via the pivot pin receptacle, the second retainer configured to pivot from a first position to a second position and from the second position to the first position, the second retainer including:
    a locking element comprising at least two locking protrusions extending from a central sidewall portion of the pivot pin, one of said locking protrusions engaging the latching arm of the first retainer in the first position of the second retainer and another one of the locking protrusions engaging the inner glass pane in the first position of the second retainer to retain the inner glass pane within the first insertion structure; and
    an actuating element including a handle extending from an upper distal end of the pivot pin, the handle being configured to pivot the second retainer from the first position to the second position and from the second position to the first position;
    wherein the inner glass pane covers a substantial portion of the actuating element when the inner glass pane is received by the first insertion structure and retained by the locking element.

2. The connecting device as recited in claim 1, wherein the first insertion structure is configured so that the inner glass pane covers a substantial portion of the first retainer when the inner glass pane is received by the first insertion structure.

3. The connecting device as recited in claim 1, wherein the first insertion structure is configured so that the inner glass pane projects laterally beyond the first retainer when the inner glass pane is received by the first insertion structure.

4. The connecting device as recited in claim 1, wherein the first insertion structure is configured so that the inner glass pane is laterally flush with the first retainer when the inner glass pane is received by the first insertion structure.

5. The connecting device as recited in claim 1, wherein the first retainer includes a first surface configured to engage the outer glass pane when the glass panes are assembled.

6. The connecting device as recited in claim 1, wherein the first retainer includes at least one additional insertion structure, each of the at least one additional insertion structure being configured to receive an additional glass pane therein.

7. The connecting device as recited in claim 6, wherein each of the at least one additional insertion structure is disposed between the first surface and the first insertion structure.

8. The connecting device as recited in claim 6, wherein each of the first insertion structure and the at least one additional insertion structure is configured to receive a corner of one of the glass panes.

9. The connecting device as recited in claim 6, wherein each of the first insertion structure and the at least one additional insertion structure includes at least one contact surface for contacting an edge of one of the glass panes.

10. The connecting device as recited in claim 9, wherein the first insertion structure includes only one contact surface.

11. The connecting device as recited in claim 9, wherein each of the at least one additional insertion structure includes at least two contact surfaces, the at least two contact surfaces being disposed at right angles to each other.

12. The connecting device as recited in claim 11, wherein one or more of the at least one additional insertion structure includes a third contact surface.

13. The connecting device as recited in claim 12, wherein the contact surface of the first insertion structure and the third contact surface are at an angle of approximately 45° to the contact surfaces of the at least one additional insertion structure.

14. The connecting device as recited in claim 1, wherein the first insertion structure includes at least one bearing surface configured to bear against at least one of the front side or rear side of the inner glass pane resting thereon.

15. The connecting device as recited in claim 14, wherein each of the at least one bearing surface lies in a respective different plane.

16. The connecting device as recited in claim 6, wherein the second retainer includes additional locking elements configured to lock a glass pane received by the at least one additional insertion structure in place when the second retainer is in the first position.

17. The connecting device as recited in claim 16, wherein the locking element and additional locking elements are configured to engage over or under glass planes received by the first insertion structure and the at least one additional insertion structure when the second retainer is in the first position.

18. The connecting device as recited in claim 16, wherein the additional locking elements are configured to press the glass panes received by the at least one additional insertion structure against the at least one bearing surface when the second retainer is in the first position.

19. The connecting device as recited in claim 16, wherein the locking element and the additional locking elements are disposed at an angle of 135° to each other.

20. The connecting device as recited in claim 1, wherein the first retainer and the second retainer are provided with snap-fit structures configured to fix the second retainer in the first position.

* * * * *